(12) United States Patent
Gagnon et al.

(10) Patent No.: US 8,784,595 B2
(45) Date of Patent: Jul. 22, 2014

(54) PROCESS FOR LAMINATING COMPONENTS OF AN ELECTROCHEMICAL CELL

(75) Inventors: Régis Gagnon, St-Jean-sur-Richelieu (CA); Jonathan Dubé, Laprairie (CA); Gilles Gagnon, Repentigny (CA); Paul-André Lavoie, Montreal (CA)

(73) Assignee: Bathium Canana Inc., Boucherville, Quebec ( * ) Notice: Subject to any disclaimer, the term of this patent is extended or adjusted under 35 U.S.C. 154(b) by 1348 days.

(21) Appl. No.: 10/898,323

(22) Filed: Jul. 26, 2004

(65) Prior Publication Data

US 2006/0016549 A1    Jan. 26, 2006

(51) Int. Cl.
  *B29C 65/18* (2006.01)
  *B29C 47/06* (2006.01)

(52) U.S. Cl.
  USPC ..................... 156/244.26; 156/322

(58) Field of Classification Search
  None
  See application file for complete search history.

(56) References Cited

U.S. PATENT DOCUMENTS

| | | | |
|---|---|---|---|
| 3,316,137 A * | 4/1967 | Reuben Wisotzky | 156/209 |
| 3,582,430 A * | 6/1971 | Benigno | 156/309.9 |
| 5,100,746 A | 3/1992 | Muller et al. | |
| 5,536,278 A | 7/1996 | St-Amant et al. | |
| 5,685,471 A | 11/1997 | Taubenberger | |
| 5,849,137 A * | 12/1998 | Hogge et al. | 156/500 |
| 6,143,216 A * | 11/2000 | Loch et al. | 264/45.1 |
| 6,187,061 B1 * | 2/2001 | Amatucci et al. | 29/25.03 |
| 2003/0072999 A1 | 4/2003 | Birke et al. | |
| 2003/0215710 A1 * | 11/2003 | Lavoie et al. | 429/212 |
| 2004/0086774 A1 * | 5/2004 | Munoz et al. | 429/42 |
| 2004/0123450 A1 | 7/2004 | Ward et al. | |
| 2006/0166093 A1 * | 7/2006 | Zaghib et al. | 429/217 |

FOREIGN PATENT DOCUMENTS

| | | |
|---|---|---|
| EP | 0730952 A2 | 9/1996 |
| JP | 60125646 A | 7/1985 |
| JP | 11-067234 | 3/1999 |
| JP | 11-176473 | 7/1999 |
| JP | 11-339775 | 12/1999 |
| JP | 2000-294285 | 10/2000 |
| WO | WO9905744 A1 | 2/1999 |
| WO | WO 2004/045007 A2 * | 5/2004 |

OTHER PUBLICATIONS

European Search Report; Oct. 15, 2007; Munich; Boussard, Nadege.

* cited by examiner

*Primary Examiner* — Barbara J Musser
(74) *Attorney, Agent, or Firm* — McMillan LLP

(57) ABSTRACT

A process for laminating at least one electrode sheet onto an electrically conductive support film is provided. The process comprises heating the electrically conductive support film and laminating the at least one electrode sheet onto at least one side of the heated electrically conductive support film. An apparatus for laminating at least one electrode sheet onto an electrically conductive support film is also provided. The apparatus comprises lamination rollers forming a nip and means for carrying the electrically conductive support film and the at least one electrode sheet to the nip formed by the lamination rollers. The apparatus also comprises a heater for heating the electrically conductive support film before the electrically conductive support film reaches the nip formed by the lamination rollers.

8 Claims, 3 Drawing Sheets

PROCESS FOR LAMINATING COMPONENTS OF AN ELECTROCHEMICAL CELL

FIELD OF INVENTION

The present invention relates generally to lithium polymer batteries and, more particularly, to a process and an apparatus for assembling components of thin film electrochemical cells for lithium polymer batteries.

BACKGROUND OF THE INVENTION

Rechargeable batteries manufactured from laminates of solid polymer electrolytes and sheet-like anodes and cathodes displays many advantages over conventional liquid electrolytes batteries. These advantages include lower overall battery weight, high power density, high specific energy, longer service life, and environmental friendliness since the danger of spilling toxic liquid into the environment is eliminated.

Lithium polymer battery components include positive electrodes, negative electrodes and an electrolyte separator capable of permitting ionic conductivity, such as an electrolyte consisting of a polymer and a lithium salt, sandwiched between the positive and negative electrodes. The negative electrodes, or anodes, are usually made of light-weight metals such as alkali metals and alloys, typically lithium metal, lithium oxide, lithium-aluminum alloys and the like, or of carboneous material such as coke or graphite intercalated with lithium ion to form $Li_xC$. The composite positive electrodes, or cathodes, are usually formed of a mixture of insertion material, electronic conductive filler, usually carbon or graphite or mixture thereof, and an ionically conductive polymer electrolyte material, the mixture being set on a current collector, for example, a thin sheet of aluminum.

Composite cathode thin films are usually obtained by solvent coating onto a current collector or by melt extrusion deposited onto the current collector film.

Similarly, the polymer electrolyte separator layer is typically produced by solvent coating or by melt extrusion. Solid lithium polymer electrochemical cells are typically manufactured by separately preparing the positive electrode, the electrolyte separator and the negative electrode and thereafter laminating each component together to form an electrochemical cell. U.S. Pat. No. 5,536,278 to Armand et al. discloses one method of assembling the various components of a solid lithium polymer electrochemical cell. The positive electrode thin film is coated or layered onto a current collector. The polymer electrolyte is coated onto a plastic substrate such as a film of polypropylene. The positive electrode is thereafter laminated onto one face of the electrolyte, and the plastic substrate is then removed from the other face of the electrolyte and the lithium negative electrode is applied thereon. Although this manufacturing process is reasonably efficient for research and development and small-scale production of lithium polymer electrochemical cells, it is inadequate for large-scale production of such cells.

U.S. Pat. No. 5,100,746 to Gauthier discloses a method of laminating simultaneously a plurality of layers of components of an electrochemical cell that is adapted to speed up the manufacturing process, wherein double-layer solid polymer electrolyte/composite positive electrode sub-assemblies are subsequently associated with the other constituent layers of the electrochemical cell.

Co-pending U.S. Patent Application Publication no. 2003/0215710A1 discloses an efficient method of manufacturing a positive electrode film through a single or twin screw extruder and either depositing the positive electrode film directly onto a moving current collector film, or handling the positive electrode film through one or more rollers and thereafter laminating it onto a moving current collector film. To achieve cost-effective production levels and to produce a high quality electrochemical cell, the lamination of the positive electrode film onto the current collector must be fast and the positive electrode film must adhere properly onto a substrate such as a current collector.

In order to improve the efficiency of the production process for large-scale manufacturing of lithium polymer batteries, there is a need for an improved method and apparatus for laminating a composite positive electrode onto a substrate support film.

SUMMARY OF THE INVENTION

It is an object of the present invention to provide a process for laminating and assembling a composite positive electrode film onto a substrate support film.

It is another object of the present invention to provide an apparatus for laminating and assembling a composite positive electrode film onto a substrate support film.

In accordance with a first broad aspect, the invention provides a process for laminating at least one electrode sheet onto an electrically conductive support film. The process comprises heating the electrically conductive support film and laminating the at least one electrode sheet onto at least one side of the heated electrically conductive support film.

In a specific non-limiting example of implementation, the at least one electrode sheet is also heated prior to lamination. Advantageously, a first electrode sheet is laminated onto a first side of the heated electrically conductive support film and a second electrode sheet is laminated onto a second side of the heated electrically conductive support film. Furthermore, in a specific embodiment, the first side of the electrically conductive support film is first brought into contact with the first electrode sheet and, thereafter, the second side of the electrically conductive support film is brought into contact with the second electrode sheet.

In a particular example of implementation, the lamination of the electrode sheet or sheets onto the heated electrically conductive support film is carried out through the nip of a pair of rollers. In a specific embodiment, the electrically conductive support film is passed through a series of stabilizing rollers prior to lamination. Also, in a particular embodiment, the at least one electrode sheet is self-supporting.

In accordance with a second broad aspect, the invention provides an apparatus for laminating at least one electrode sheet onto an electrically conductive support film. The apparatus comprises lamination rollers forming a nip and means for carrying the electrically conductive support film and the at least one electrode sheet to the nip formed by the lamination rollers. The apparatus also comprises a heater for heating the electrically conductive support film before the electrically conductive support film reaches the nip formed by the lamination rollers.

In a specific example of implementation, the means for carrying the electrically conductive support film and the at least one electrode sheet to the nip formed by the lamination rollers comprises means for carrying a first electrode sheet and a second electrode sheet to the nip. In a specific embodiment, the means for carrying the first electrode sheet and the second electrode sheet to the nip is adapted to laminate the first electrode sheet onto a first side of the electrically conductive support film and to laminate the second electrode sheet onto a second side of the electrically conductive support film. Advantageously, the heater is a first heater and is aimed at a contact point between the electrically conductive support film and the first electrode sheet, and the apparatus said further comprises a second heater aimed at a contact point between the electrically conductive support film and the second electrode sheet.

In a particular example of implementation, the apparatus further comprises means for applying and controlling a pressure exerted by the lamination rollers at the nip onto the electrically conductive support film and the at least one electrode sheet.

These and other aspects and features of the present invention will now become apparent to those of ordinary skill in the art upon review of the following description of specific examples of implementation of the invention in conjunction with the accompanying drawings.

BRIEF DESCRIPTION OF THE DRAWINGS

A detailed description of specific examples of implementation of the present invention is provided herein below, by way of example only, with reference to the accompanying drawings, in which.

Figure 1:
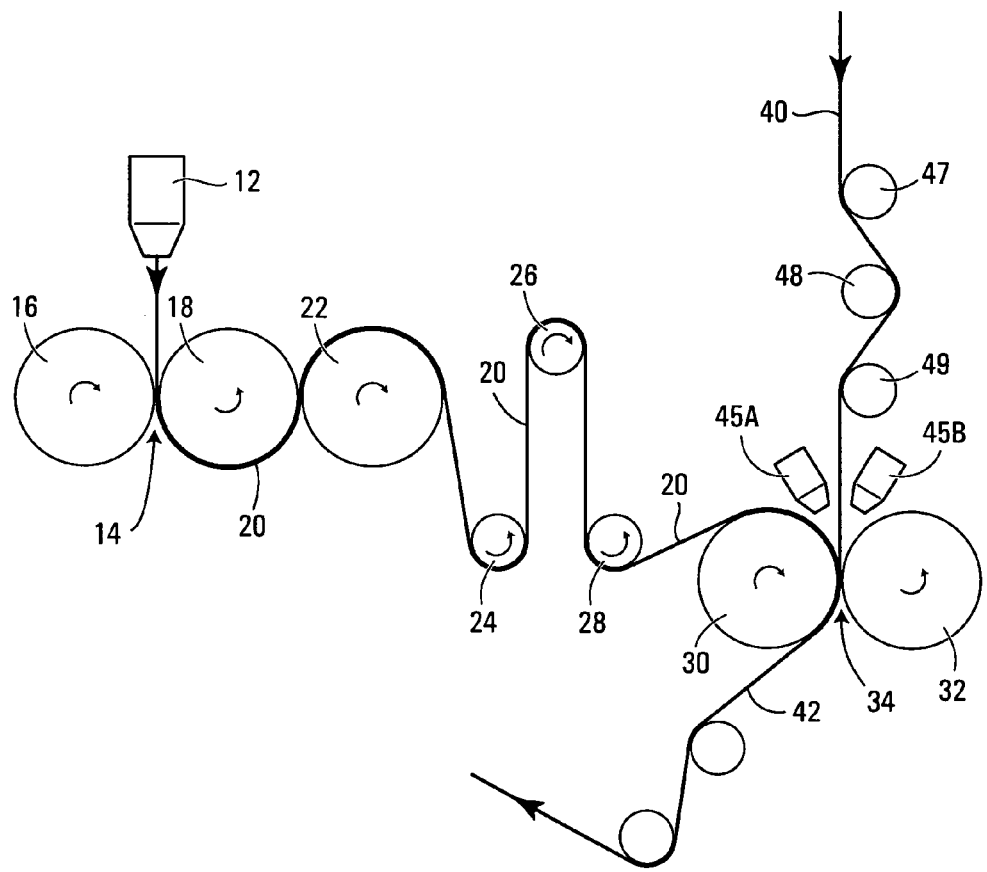
FIG. 1 is a schematic frontal view of a lamination apparatus according to a first non-limiting example of implementation of the invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

In general, the production of thin sheets of composite electrode material is most efficiently done by melt extrusion through a slit die. The various constituents of the composite electrode material are fed from one or more hoppers into an extruder where they are melted, mixed and transported through an air-tight cylinder via a mixing screw. The molten material is extruded toward the slit die and discharged through an elongated discharge port of the slit die adjusted to a desired thickness of film or sheet at a constant rate. The production of thin sheets of composite electrode material may also be done by a solvent coating method.

FIG. 1 illustrates a first specific non-limiting example of implementation of a lamination apparatus in which a composite cathode material is extruded through a slot die 12 and into a nip 14 formed by a pair of rollers 16 and 18 maintained at a certain temperature. For instance, the temperature at which the rollers 16 and 18 are maintained can be of 12° C. or less. The extruded composite cathode material is thereby formed into a sheet or film 20 of a certain thickness. For example, the thickness of the composite cathode sheet 20 may be in the range of about 30 μm to about 100 μm. The composite cathode sheet 20 remains in contact with the roller 18 for approximately 180° of rotation, during which time it is allowed to cool and acquire a solid state.

The composite cathode sheet 20 is then transferred onto the surface of the roller 22, which is also maintained at a certain temperature, and remains in contact with the surface of the roller 22 for a portion of its rotation. The composite cathode sheet 20 then follows the path defined by rollers 24, 26 and 28 which leads to lamination rollers 30 and 32. In a particular example of implementation, the composite cathode sheet 20 is self-supporting. That is, it is sufficiently consistent to be self-supporting and does not require a support film, such as, for example, a plastic film, in order to be transported from the slot die 12 to the lamination rollers 30 and 32.

In contact with the surface of the lamination roller 30, the composite cathode sheet 20 follows the rotation of the lamination roller 30 and enters into a nip 34 formed between the lamination rollers 30 and 32. In the nip 34, the composite cathode sheet 20 meets and is bonded to an electrically conductive support film 40 under the pressure exerted by the lamination rollers 30 and 32 to form a single side or monoface cathode/current collector laminate 42. The position of the lamination rollers 30 and 32 is adjustable such that the pressure applied onto the cathode/current collector laminate 42 being formed is also adjustable. Advantageously, the pressure is maintained between about 10 psi and about 30 psi. In a particular example of implementation, the pressure is maintained at about 20 psi. The cathode/current collector laminate 42 is then either rolled up for storage or transported to another processing station.

In the non-limiting example of implementation shown in FIG. 1, the electrically conductive support film 40 is heated by a pair of heaters 45A and 45B prior to entering the nip 34 and bonding with the composite cathode sheet 20. Each one of the heaters 45A and 45B may be any type of heating device adapted to direct heat towards a target area, such as, for example, an infrared light or an electrical resistance element with or without air flow ventilation. The surface temperature of the electrically conductive support film 40 is raised by heaters 45A and 45B in order to increase the quality of adhesion between the composite cathode sheet 20 and the electrically conductive support film 40. When the composite cathode sheet 20 contacts the heated surface of the electrically conductive support film 40, the surface of the composite cathode sheet 20 softens to create an intimate interface with the surface of the electrically conductive support film 40, thereby forming an intimate bond between the two sheets 20 and 40. In a particular example of implementation, the electrically conductive support film 40 is heated to a temperature of approximately 40° C. However, it is to be understood that the temperature at which the electrically conductive support film 40 is heated may vary widely depending on the type of material and thickness of the electrically conductive support film 40.

Advantageously, in the specific example of implementation shown in FIG. 1, the heaters 45A and 45B are aimed directly at the nip 34 formed by the lamination rollers 30 and 32, thereby heating simultaneously the electrically conductive support film 40 and the composite cathode sheet 20. In so doing, the temperature of the electrically conductive support film 40 is raised and the composite cathode sheet 20 is softened in order to increase the quality of adhesion between the composite cathode sheet 20 and the electrically conductive support film 40.

The electrically conductive support film 40 refers to any type of current collector known to those skilled in the art of electrochemical cells. For example, suitable current collectors can be selected from the group consisting of metallic foils in general, and more specifically metallic foils of aluminum, copper, nickel and alloys of those metals, conductive plastics, metal coated polymer sheets, metallic foils or grids coated with adhesion promoters, anti-corrosion protective layers, metal oxides, and various other types of conductive member devised over decades of research and development.

In the non-limiting example of implementation shown in FIG. 1, the electrically conductive support film 40 passes through a series of rollers 47, 48 and 49 prior to lamination. The combination of the rollers 47, 48 and 49 stabilizes the electrically conductive support film 40 such that it does not waver or seesaw when entering the nip 34 and contacting the composite cathode sheet 20.

Figure 2:
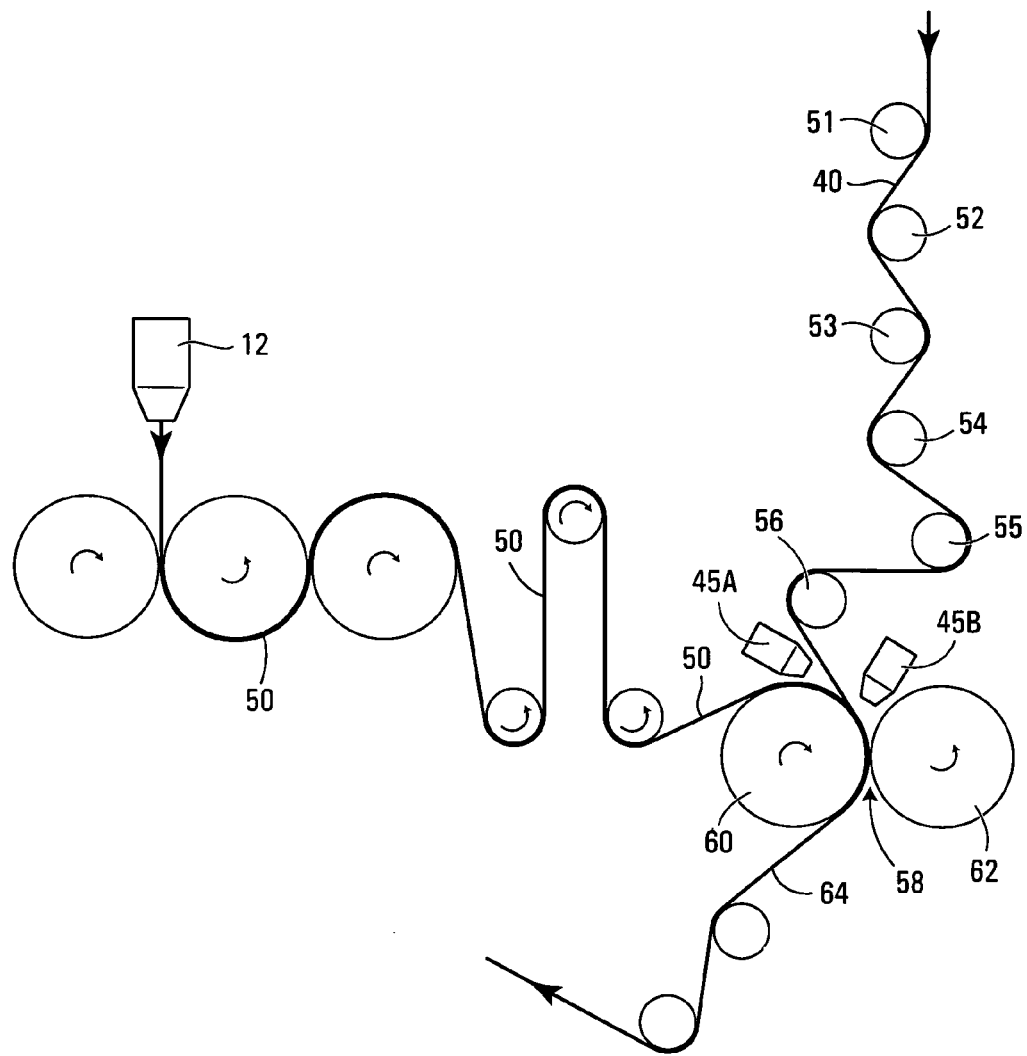
FIG. 2 is a schematic frontal view of a lamination apparatus according to a second non-limiting example of implementation of the invention.

FIG. 2 illustrates a second specific non-limiting example of implementation of the lamination apparatus in which additional stabilizing rollers 51, 52, 53, 54, 55 and 56 define a more intricate path adapted to prevent lateral wavering and zigzagging of the electrically conductive support film 40. Furthermore, the last stabilizing roller 56 is in an offset position relative to the nip 58 formed by the lamination rollers 60 and 62. The offset position of the stabilizing roller 56 directs the electrically conductive support film 40 such that the electrically conductive support film 40 meets the composite electrode sheet 50 before entering the nip 58. The tension of the electrically conductive support film 40 exerts the initial force or pressure which bonds together the electrically conductive support film 40 and the composite electrode sheet 50.

The heaters 45A and 45B are positioned to accommodate the angular entry of the electrically conductive support film 40 into the nip 58 defined by the lamination rollers 60 and 62. The heater 45A is aimed at the meeting point of the electrically conductive support film 40 and the composite electrode sheet 50 such that they are heated simultaneously to promote adhesion at the initial contact point of the composite electrode sheet 50 and the electrically conductive support film 40. Thereafter, the monoface laminate 64, comprising the composite electrode sheet 50 and the electrically conductive support film 40, enters the nip 58 where it is put under pressure applied by the lamination rollers 60 and 62 to securely bond together the two layers of the laminate 64. The laminate 64 is then carried away for storage or transported to another processing station.

Figure 3:
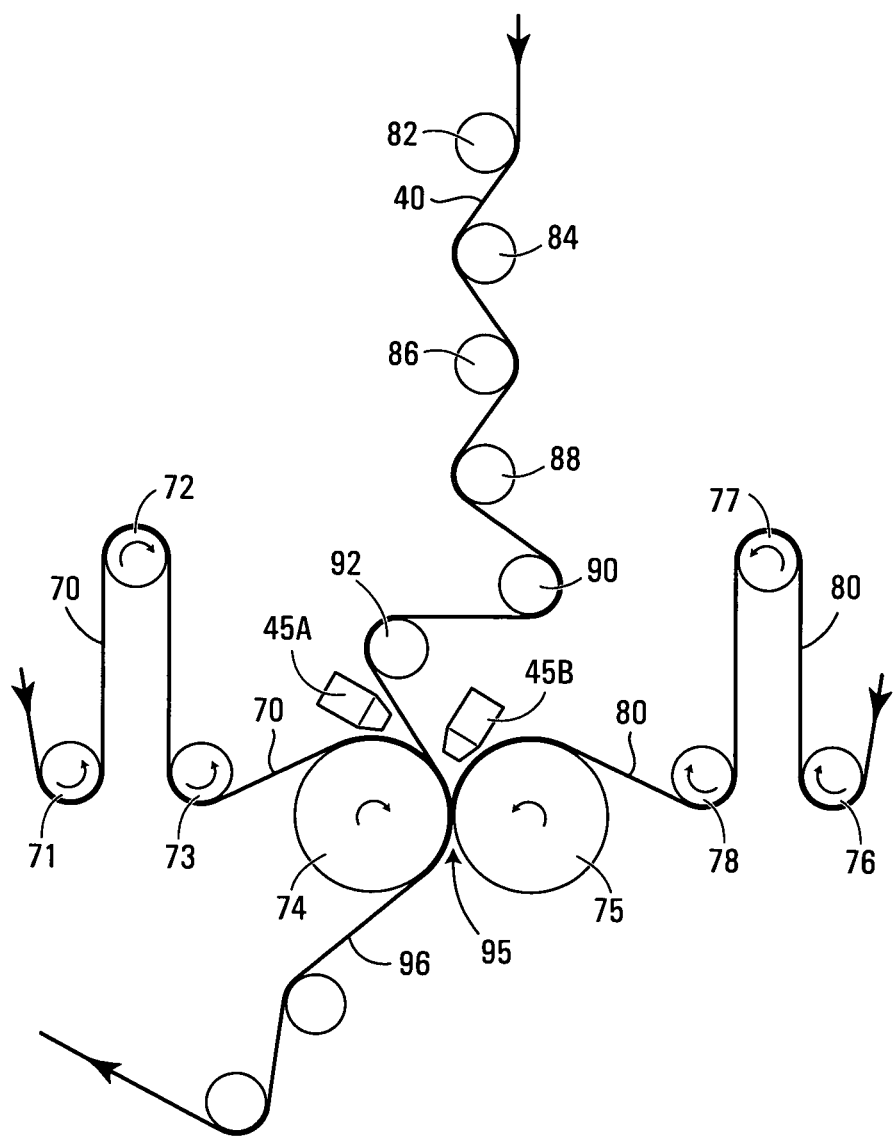
FIG. 3 is a schematic frontal view of a lamination apparatus according to a third non-limiting example of implementation of the invention.

FIG. 3 illustrates a lamination apparatus in accordance with a third specific non-limiting example of implementation of the invention. A first electrode sheet 70 exiting a slot die is routed through a series of rollers 71, 72 and 73 and led to a lamination roller 74. A second electrode sheet 80 exiting another slot die is routed through a series of rollers 76, 77 and 78 and led to a lamination roller 75.

An electrically conductive support film 40 is routed through a series of stabilizing rollers 82, 84, 86, 88, 90 and 92 which prevent wavering and zigzagging of the electrically conductive support film 40, thereby ensuring that the electrically conductive support film 40 is stable when it is bonded to the first electrode sheet 70. The last stabilizing roller 92 is in an offset position relative to a nip 95 formed by the lamination rollers 74 and 75 such that the electrically conductive support film 40 meets and is bonded to the first electrode sheet 70 at an acute angle before entering the nip 95. The tension of the electrically conductive support film 40 exerts the initial force or pressure which bonds the electrically conductive support film 40 to the first electrode sheet 70.

Heaters 45A and 45B are positioned to accommodate the angular entry of the electrically conductive support film 40 into the nip 95 formed by the lamination rollers 74 and 75. The heaters 45A and 45B are respectively aimed at the meeting points of the electrically conductive support film 40 and the first and second electrode sheets 70 and 80 such that they are heated simultaneously to promote adhesion at the initial contact points of the electrode sheets 70 and 80 and the electrically conductive support film 40. The surface temperature of the electrically conductive support film 40 is raised by the heaters 45A and 45B and the first and second electrode sheets 70 and 80 are softened in order to increase the quality of adhesion and create an intimate interface between the electrode sheets 70 and 80 and the electrically conductive support film 40.

Therefore, one side of the electrically conductive support film 40 is first laminated onto the first electrode sheet 70. The second electrode sheet 80 is then laminated onto the other side of the electrically conductive support film 40 when entering the nip 95. The lamination rollers 74 and 75 apply pressure onto a laminate 96, comprising the first and second electrode sheets 70 and 80 and the electrically conductive support film 40, in order to increase the adhesion between the components of the laminate 96 and to prevent any air bubbles from forming between the electrode sheets 70 and 80 and the electrically conductive support film 40. Thereafter, the bi-face laminate 96, which comprises the electrode sheets 70 and 80 each securely bonded to a respective side of the electrically conductive support film 40, is carried away for storage or transported to another processing station.

The heaters 45A and 45B heat the electrically conductive support film 40 to a temperature of approximately 40° C. However, this temperature may vary widely depending on the type of material and thickness of the electrically conductive support film 40.

The pressure applied by the lamination rollers 74 and 75 may vary widely depending on the type of electrode material being laminated. For instance, in a particular example of implementation in which the electrode sheets 70 and 80 include a material comprising transitional metal oxide as the active material, the pressure exerted by the lamination rollers 74 and 75 is maintained between about 10 psi and about 30 psi. Advantageously, the pressure exerted by the lamination rollers 74 and 75 is maintained at about 20 psi. The application and control of the pressure exerted by the lamination rollers 74 and 75 at the nip 95 is achieved by either an hydraulic or pneumatic system (not shown) or by a mechanical system (not shown) with or without sensors.

In the particular examples of implementation illustrated in FIGS. 1, 2 and 3, the electrode sheets 20, 50, 70 and 80 are self-supporting and do not require a support film, such as, for example, a plastic film, in order to be transported to the lamination rollers. However, in other examples of implementation, a support film, such as a plastic support film, may be used for transporting each of the electrode sheets.

Although various examples of implementation have been illustrated, this was for the purpose of describing, but not limiting, the invention. Various modifications will become apparent to those skilled in the art and are within the scope of the present invention, which is defined more particularly by the attached claims.

The invention claimed is:

1. A process for laminating a pair of electrode sheets onto an electrically conductive support film for lithium polymer batteries, said process comprising:

(a) routing melted electrode material through first and second series of at least two cold rollers, the first and second series of at least two cold rollers being maintained at a temperature of 12° C. or less to cool and solidify the electrode material thereby respectively forming first and second electrode sheets having a thickness ranging from 30 to 100 µm without a support films; the first and second electrode sheets remaining in contact with their corresponding first and second series of at least two cold rollers for a portion of the rotation of the corresponding at least two cold rollers to acquire a solid state and respectively form first and second self-supporting electrode sheets;

(b) routing an electrically conductive support film having a first side and a second side through a nip formed by a pair of lamination rollers
(c) routing the first self-supporting electrode sheet from the first series of at least two cold rollers to a third series of rollers defining a path leading to the nip and laminating the first self-supporting electrode sheet onto the first side of the electrically conductive support film before entering the nip formed by the pair of lamination rollers; and
(d) routing the second self-supporting electrode sheet from the second series of at least two cold rollers to a fourth series of rollers defining a path leading to the nip and laminating the second self-supporting electrode sheet onto the second side of the electrically conductive support film through the nip formed by the pair of lamination rollers;
wherein the first side of the electrically conductive support film and the first electrode sheet are heated with a heating device adapted to direct heat towards a meeting point of the first electrode sheet and the first side of the electrically conductive support film such that the first electrode sheet and the first side of the electrically conductive support film are heated simultaneously prior to laminating the first electrode sheet onto the first side of the electrically conductive support film, and the second side of the electrically conductive support film and the second electrode sheet are heated with a second heating device adapted to direct heat towards a meeting point of the second electrode sheet and the second side of the electrically conductive support film such that the second electrode sheet and the second side of the electrically conductive support film are heated simultaneously prior to entering the nip formed by the pair of lamination rollers.

2. A process as defined in claim 1, wherein the electrically conductive support film is stabilized through a series of stabilizing rollers before lamination of the first and second self-supporting electrode sheets.

3. A process as defined in claim 1, wherein pressure is applied onto the electrically conductive support film and the pair of electrode sheets as they pass through the nip formed by the pair of lamination rollers.

4. A process as defined in claim 1, wherein the electrically conductive support film meets one of the self-supporting electrode sheets at an acute angle.

5. A process as defined in claim 1, wherein the first side of the electrically conductive support film is first brought into contact with the first self-supporting electrode sheet and the second side of the electrically conductive support film is thereafter brought into contact with the second self-supporting electrode sheet.

6. A process as defined in claim 1, wherein the self-supporting electrode sheets are obtained through an extrusion process.

7. A process as defined in claim 1, wherein the electrically conductive support film is a current collector selected from the group consisting of metallic foils of aluminum, copper, nickel and alloys of these metals, conductive plastics, metal coated polymer sheets, metallic foils or grids coated with adhesion promoters, metallic foils or grids coated with anti-corrosion protective layers, and metallic foils or grids coated with metal oxides.

8. A process as defined in claim 1, wherein the electrically conductive support film is heated by a heating device selected from the group consisting of an infrared light and an electrical resistance element.

* * * * *